United States Patent Office 3,001,968
Patented Sept. 26, 1961

3,001,968
STABILIZED HALOGENATED POLYETHYLENE
Peter J. Canterino and Kenneth R. Mills, Bartlesville, Okla., assignors to Phillips Petroleum Company, a corporation of Delaware
No Drawing. Filed Sept. 27, 1957, Ser. No. 686,605
7 Claims. (Cl. 260—45.7)

This invention relates to a halogenated highly crystalline polyolefin. In one of its aspects, this invention relates to a novel stabilizer for halogenated highly crystalline olefin polymers. In a second aspect, this invention relates to a method of adding stabilizer to a highly halogenated highly crystalline polyolefin. In still another aspect, this invention relates to a thermally stable halogenated highly crystalline polyolefin.

There has recently come into prominence a polyolefin distinguished from those of the prior art generally by its higher density, higher crystallinity and higher softening temperatures. These polyolefins are generally produced at only moderately elevated temperatures and pressures. These materials can be characterized as polymers of olefins which polymers have a crystallinity at ambient temperatures and as determined by nuclear magnetic resonance of at least 70 percent. Preferably the density is at least about 0.95 and the crystallinity is at least 80 percent. More preferably, the density is at least about 0.96 and the crystallinity 90 percent or higher.

It has also been recently discovered that these highly crystalline polyolefins can be halogenated to give products ranging from rubbery to leathery to resinous and can be used for molding, extrusion or casting articles of commerce.

While these newer methods of halogenating such highly crystalline polymers provide halogenated materials which are relatively thermally stable, especially at lower halogen contents, these materials do show a tendency to decompose upon prolonged exposure to high heat and those highly halogenated polymers tend to decompose on the compounding mills making the incorporation of stabilizers difficult.

It is an object of this invention to provide a method of stabilizing halogenated polyolefins. It is another object of this invention to provide a thermally stabilized halogenated polyolefin. It is still another object of this invention to provide a novel method of incorporating a stabilizer into a highly halogenated polyolefin.

According to one embodiment of this invention, halogenated polyolefins prepared by halogenation of high density, highly crystalline olefin polymers are stabilized against degrading action of heat and ultraviolet light by the incorporation therein of a stabilizing amount of an alkali metal or alkaline earth metal organophosphate.

According to a second embodiment of this invention, a solution or a dispersion of a stabilizer is admixed with a solution of a halogenated highly crystalline polyolefin and thereafter the admixture is precipitated as an intimate dispersion of stabilizer and polymer.

A highly satisfactory and often preferred, highly crystalline olefin polymer to be halogenated can be obtained by the process set forth in the copending application of Hogan and Banks, Serial No. 573,877, filed March 26, 1956, now Patent No. 2,825,721. According to that application, polymers are produced by polymerizing 1-olefins having a maximum chain length of 8 carbon atoms and no branching nearer the double bond than the four-position by contacting with a solid catalyst containing, as an essential catalytic ingredient, chromium oxide associated with at least one porous oxide selected from the group consisting of silica, alumina, zirconia, and thoria. Liquid phase or vapor phase operation can be employed. A highly satisfactory method involves contacting the monomer in the presence of a hydrocarbon diluent, in liquid phase, with a suspended comminuted catalyst of the type described by Hogan and Banks. It is preferred that the chromium content of the catalyst be in the range of 0.5 to 10 weight percent and that an appreciable proportion of the chromium be in the hexavalent state. This catalyst is generally activated under non-reducing conditions, preferably by contact with an oxidizing gas such as air, at high temperatures, e.g. 700–1000° F. prior to use. By one method of operation, the polymerization is carried out in a solvent such as cyclohexane at a temperature above the solution temperature of the polymer being formed, e.g., 250–375° F., for polyethylene. In another method the polymerization is carried out in a solvent such as pentane at a temperature below the solution temperature thereby forming polymer of discrete particles. In any case, the polymer is separated from diluent by filtration, hydrocarbon flashing, steam distillation or the like. Polyethylene produced by such process will ordinarily have a molecular weight in the range of 35,000 to 280,000 or higher, a density in the range of 0.95 to 0.97, e.g., approximately 0.96, and a crystallinity in the range 90 to 95 percent. The tensile strength of the polymer, as produced, will ordinarily be of the order of 4,000 to 5,000 p.s.i. but can be higher or lower. The polymer, being highly crystalline, can be oriented which will generally improve the tensile strength in the oriented direction. The polymer ordinarily has a melting point of approximately 250–255° F. and a softening point of about 265° F. or higher. The difference between melting point and softening point is due to the difference in methods by which these values are obtained as is known by those skilled in the polymer art. Polymers produced by these processes have unsaturation which is preponderantly of the terminal vinyl and/or transinternal structure. So-called "branched vinyl" unsaturation is substantially absent. These terms are more fully discussed in the cited Hogan and Banks application.

Another suitable, but non-equivalent, method of producing highly crystalline, high density polymers comprises contacting an olefin such as ethylene, propylene, 1-butene and the like with a catalyst such as a mixture of a compound represented by the formula $AlR_3$ wherein R is a saturated aliphatic, cycloaliphatic or aromatic hydrocarbon radical or hydrogen; and a second compound which is ordinarily a halogen compound of a metal such as titanium, zirconium, chromium or molybdenum. An example of such a catalyst is a mixture of triethylaluminum and titanium tetrachloride. A similar suitable catalyst comprises a mixture of a compound represented by the formula $R_mAlX_n$ wherein R is a hydrocarbon radical of the type previously described, X is a halogen and $m+n=3$, i.e., the valence of aluminum, and a metal compound such as titanium dioxide, tetraalkoxides of titanium and tetravalent titanium salts of organic carboxylic acids. An example of such a catalyst is a mixture of diethylaluminum chloride, ethyl aluminum dichloride and titanium tetrachloride. A similar type of catalyst mixture comprises a halide of a group IV metal, e.g., titanium tetrachloride and a free metal, such as metallic sodium or metallic magnesium. The reaction with these catalysts is preferably carried out in the presence of a hydrocarbon diluent in liquid phase at a temperature in the range from room temperature up to about 300° C. Polymers produced in the presence of these catalysts have molecular weights which can range from 10,000 to 200,000 or higher. They generally have crystallinities of the order of 80 to 85 percent and densities of about 0.95.

It will be noted that the foregoing specifications as to density and crystallinity are not satisfied by most of the polyethylenes which have hitherto been available on the market. Most such polyethylenes have been produced by polymerizations at extremely high pressures, e.g., of the order of 10,000 p.s.i. or higher, usually in the presence of a peroxide type catalyst or without any added catalyst. These materials ordinarily have densities of the order of 0.91 or 0.92 and crystallinities generally of 60 percent and lower. They ordinarily have molecular weights within the general range 5,000 to 30,00 and tensile strengths of the order 1,500 to 2,000 p.s.i. The unsaturation in such polymers is preponderantly of the branched vinyl type.

It is known in the art to halogenate these high pressure polymerized polyethylenes in solution in a solvent. Of the solvents used, carbon tetrachloride is frequently preferred since it is inert under the conditions of the reaction and is sufficiently low-boiling to be readily separated from the reaction product. Other solvents can, however, be employed, such as chloroform, symmetrical dichloroethane, 1,1,1-trichloroethane, ethylidene chloride and the like. Such high pressure polyethylenes can be dissolved in carbon tetrachloride or similar solvent either under reflux conditions or at lower temperatures and atmospheric pressure, and halogenation can be effected in solution to given rubbery products or resinous depending upon the degree of halogenation. However, these low pressure, highly crystalline polymers are not soluble in these low boiling solvents even under refluxing conditions at atmospheric pressure and special techniques are employed to insure uniform halogenation. One such process is fully described and claimed in the copending application of Peter J. Canterino, Serial No. 442,891, filed July 12, 1954. According to that invention a solid polyolefin which is substantially insoluble in carbon tetrachloride and other low-boiling chlorinated solvents at atmospheric pressure, is subjected to halogenation with a halogenating reactant while the polymer is maintained in solution in such solvent at a temperature above the normal boiling point of the solvent and below the temperature at which the polymer begins to decompose and at superatmospheric pressures sufficient to maintain the solvent substantially in the liquid phase. The temperature employed is preferably in the range 95–130° C. when carbon tetrachloride is the solvent. Suitable catalysts such as peroxides and/or ultraviolet light can be employed. After the polymer contains about 15–25 percent combined halogen, the polymer is soluble at atmospheric pressure and it is frequently preferred to lower the pressure prior to continuing the halogenation. The halogenation can continue at atmospheric pressure until a polymer containing 25–70 or even 75 percent combined halogen is obtained.

In a second method for halogenating these highly crystalline polymers as described and claimed in the copending application of Canterino and Baptist, Serial No. 446,666, filed July 29, 1954, now Patent No. 2,920,064, the polymer is first dissolved in a solvent selected from the group consisting of tetrachloroethane, chlorobenzene and dichlorobenzene wherein the polymer is halogenated until it contains about 13 to 20 weight percent combined halogen after which the partially halogenated polymer is dissolved in a low boiling solvent such as carbon tetrachloride, chloroform, and methylene chloride where it is further halogenated. In this method, catalysts of the type described above can also be employed.

In still another but non-equivalent method, new halogenated 1-olefin polymers of superior physical properties can be prepared by a two-stage process comprising introducing the halogen into the polymer while in solution either under pressure or in one of the solvents of the first stage of Patent No. 2,920,064, until a portion of the halogen has been introduced and thereafter cooling the solution to below the temperature wherein the polymer comes out of solution and thereafter continuing the halogenation to the desired halogen content.

While the halogenated polyethylenes which are prepared by the above-described methods are highly useful materials, such halogen-containing polymers have the disadvantage of being adversely affected by heat and ultraviolet light. Elevated temperatures affect these polymers in that the polymeric material changes from a clear, relatively non-colored material to a hazy or opaque material of a tan to brown color. Furthermore, the tensile strength of these materials decrease rapidly with increasing time at elevated temperatures. Other properties such as elongation and modulus are similarly affected. As the halogen content of these highly crystalline polymers is increased, the rigidity and softening temperatures of these polymers are also increased. As the chlorine content of chlorinated highly crystalline, high density olefin polymers is increased to a level above about 50–60 weight percent chlorine, it becomes impossible to add stabilizers to such a material in the usual manner, e.g., by milling in the stabilizer. At chlorine contents above this level, the softening point of the polymer is above the temperature at which the polymer begins to decompose, so as to give off chlorine and hydrogen chloride.

It is now discovered that organophosphates of a formula selected from the group consisting of $$M_{2/x}[PO_3(OR)] \text{ and } M_{2/x}[P_2O_5(OR)_2]$$

wherein M is a metal selected from the group consisting of alkali and alkaline earth metals, including magnesium, $x$ is the valence of the metal M, and R is an alkyl radical containing from 1 to 5 carbon atoms, inclusive, are excellent stablizers for halogenated polyolefins.

It is also within the scope of this invention to employ mixtures of two or more of the above-defined organophosphates. It is also within the scope of this invention to employ mixtures of these organophosphates with other types of stablizing agents, as for example, epoxy type stabilizers.

Some examples of specific organophosphates which can be employed as stabilizers for halogenated polyolefins according to the present invention are disodium methyl orthophosphate, disodium isopropyl orthophosphate, dilithium ethyl orthophosphate, dipotassium n-propyl orthophosphate, dicesium n-butyl orthophosphate, dirubidium methyl orthophosphate, disodium tert-butyl orthophosphate, magnesium n-pentyl orthophosphate, barium methyl orthophosphate, calcium ethyl orthophosphate, strontium isobutyl orthophosphate, disodium dimethyl pyrophosphate, dilithium diethyl pyrophosphate, dipotassium di-n-propyl pyrophosphate, dicesium diisopropyl pyrophosphate, dirubidium di-n-butyl pyrophosphate, barium dimethyl pyrophosphate, calcium diethyl pyrophosphate, strontium di-n-propyl pyrophosphate and magnesium di-n-pentyl pyrophosphate.

The amount of alkali or alkaline earth organophosphate which can be employed as a stabilizer in the previously described halogenated polyolefins should be at least 0.5 weight parts per 100 parts of the halogenated polymer. While any amount above 0.5 parts per 100 parts can be employed as desired, more than about 5 parts per 100 parts is seldom required. In general, the halogenated polyolefin will contain at least 5 weight parts of the halogen up to the theoretical maximum. For example, polyethylene can theoretically be chlorinated to a product containing up to 82 to 83 weight percent chlorine. However, a practical upper limit of halogen in polyethylene will be about 75 weight percent. While some of these alkali and alkaline earth organophosphates have been used as ultraviolet stabilizers for vinylchloride polymers, they have been found to be ineffective as heat stabilizers for such polymers. Therefore, it is surprising to find that these same alkali or alkaline earth organophosphates are excellent heat stabilizers for these halogenated highly crystalline olefin polymers.

The alkali or alkaline earth organophosphates can be incorporated into the polymer by any suitable means known to the art. For example, the stabilizer can be added to the polymer on suitable compounding mills. This process is especially suitable for those polymers having less than about 55 percent combined chlorine or equivalent halogen. It is, of course, within the scope of the invention to add other compounding ingredients on the mill along with the stabilizer.

Those halogenated polymers having 50-60 percent chlorine or equivalent weight percent halogen have a softening point, i.e., millable temperature, above the decomposition temperature of the halogenated polymer and a special method is required to satisfactorily incorporate the stabilizer. The dividing line between millable and unmillable polymer is not sharp, but the boundary lies generally within the approximate range 55-60 weight percent chloride or equivalent halogen. Therefore, as a lower limit for the method as hereinafter described will be about 50 percent by weight of combined halogen in the polymer. While this method is generally applicable to adding heat stabilizers generally, it is particularly useful in adding the organophosphate stabilizers of this invention.

As has been stated, this method comprises admixing a solution or slurry of stabilizer in a suitable liquid medium with a solution of a halogenated highly crystalline polymer containing at least 50 percent combined halogen and thereafter precipitating the polymer and stabilizer as an intimate dispersion.

Suitable solvents for the halogenated olefin polymers are, for example, carbon tetrachloride, tetrachloroethane, dichloroethane and the like. Solvents or dispersants for the stabilizer will depend upon the stabilizer employed, but it is preferred to use the same solvent or dispersant for the stabilizer as is used to dissolve the halogenated polymer. A preferred manner of operation is to add a solution or dispersion of the stabilizer to be employed directly to a solution of halogenated polymer preferably resulting from the process of halogenating the polymer in a solvent. Thus, the stabilizer is added subsequent to the halogenation, but prior to precipitation of the halogenated polymer. It is also within the scope of the invention to add other polymer additives such as pigments, reinforcing agents, plasticizers, and the like to the admixture prior to precipitation.

The admixture is precipitated preferably by use of an antisolvent such as water, alcohol, e.g., isopropyl alcohol, low boiling aliphatic hydrocarbons, e.g., up to 6 carbon atoms, and the like. One method frequently employed is passing the solution or dispersion into hot water, i.e., above the boiling point of the solvent, thereby displacing solvent and vaporizing same.

The amount of stabilizer which is added to the halogenated olefin polymer by this method of operation can vary over a wide range and will depend, at least, in part, on the particular stabilizer employed. In the case of the alkali metal or alkaline earth metal organophosphates, then at least 0.5 weight part per 100 parts of the halogenated polymer will be employed as indicated above. It is also within the scope of the invention to add an amount of stabilizer by the precipitating process of this invention to permit milling and subsequently adding additional stabilizer and other ingredients on the mill. This method will be frequently employed where it is undesirable to add other compounding ingredients by the precipitation method, e.g., those that would remain soluble under the precipitating conditions. In this case, the additional stabilizer and other ingredients can then be added on a suitable mill.

The following specific examples illustrate the superior stabilized halogenated polyolefin compositions of the present invention, but it is not intended to limit the invention to the embodiments shown therein. In this example, a chlorinated polyethylene is employed to illustrate the invention since chlorine is the most widely used halogen in commerce.

EXAMPLE I

A series of runs were made in which chlorinated highly crystalline polyethylene was admixed with the stabilizer and tested for stability at elevated temperatures. A similar series of runs were made using the same stabilizer to stabilize a typical commercial vinyl chloride polymer. These runs were carried out according to the following procedure.

Ethylene was polymerized to a high molecular weight solid polymer by a chromium oxide-catalyzed polymerization. The method employed is essentially the same as described in the copending application of Hogan and Banks, supra. The polymerization conditions were as follows:

*Polymerization conditions*

| | |
|---|---:|
| Temperature, °F | 290 |
| Pressure, p.s.i.g | 420 |
| Catalyst concentration, wt. percent | 0.09 |
| Polymer solution concentration, wt. percent | 9.0 |
| Reactor size, gallons | 60 |
| Weight percent chromium in catalyst | 2.5 |
| Cyclohexane feed rate, pounds per hour | 200 |
| Ethylene feed rate, pounds per hour | 33 |

The polymer had a crystallinity in excess of 90 percent and a density of about 0.96.

The polyethylene which was prepared in the above-described polymerization was chlorinated according to the following procedure. Fifty-five pounds of carbon tetrachloride and 2.1 pounds of the above prepared polyethylene were charged to a reactor. The reactor contents were then heated to 225° F. to cause the polyethylene to dissolve. The reactor contents were then exposed to the light of a 4-watt, fluorescent, cool white lamp, and chlorine was bubbled into the reactor. After 2 hours and 15 minutes the chlorine and the light were turned off, and the excess chlorine and HCl were vented from the reactor. The dissolved excess chlorine and HCl were then stripped from the solution by heating after which the solution was transferred to a precipitation vessel. In the precipitation vessel, the chlorinated polymer solution was treated with an excess of isopropyl alcohol to precipitate the dissolved chlorinated polyethylene. The precipitated polymer was then recovered and dried in an air oven at 160° F. Chlorine content of the chlorinated polymer was found to be 26.6 percent by weight.

The above prepared chlorinated polyethylene was then compounded with various stabilizing agents by the following procedure. The chlorinated ethylene polymer was placed in a roll mill which was maintained at 225° F., and the material was banded on the mill until the polymer was molten. The desired amount of stabilizing material was then milled into the polymer. In the runs in which more than one stabilizing ingredient was added to the polymer, the stabilizing ingredients were blended together before adding them to the polymer on the mill. After all of the stabilizing material had been added to the polymer on the mill, the polymer-stabilizer composition was milled for 6 minutes to insure a homogeneous composition. Similar runs were made in which commercial vinyl chloride polymer (Goodrich PVC) was stabilized. In the runs involving vinyl chloride polymers, the dry PVC and an amount of dioctylphthalate were dry blended together, and the blend was allowed to stand for 2 hours at room temperature. The blend was then placed on the mill and milled at 275° F. The desired amount of stabilizing material was then added by the same method as was used in the chlorinated polyethylene. The stabilized compositions were then molded, and the physical properties of the molded samples was determined. The chlorinated polyethylene products were molded at 275° F., while the PVC products were molded at 285° F. The molded products were oven aged at 200° C. for various periods of time, after which the physical properties of these oven aged samples were determined. The results of these runs are expressed below as Table I.

TABLE I

*Physical properties of chlorinated highly crystalline polyethylene and plasticized polyvinyl chloride after oven aging at 200° C.*

NO OVEN AGING

| Recipe Number[1] | Tensile Strength, p.s.i. | Elongation, Percent | 100% Modulus, p.s.i. | Hardness, Shore D | Flex Temp., °F. | Color |
|---|---|---|---|---|---|---|
| 1 | 2,408 | 1,770 | 335 | 22 | −60 | Clear. |
| 2 | 2,913 | 500 | 1,020 | 31 | −49 | Do. |
| 3 | 2,398 | 1,630 | 350 | 25 | −72 | Do. |
| 4 | 2,745 | 390 | 1,210 | 32 | −36 | Do. |
| 5 | 2,229 | 1,720 | 350 | 23 | −52 | Brown. |
| 6 | 2,792 | 340 | 1,170 | 35 | −34 | Do. |

OVEN AGED FOR 30 MINUTES

| | | | | | | |
|---|---|---|---|---|---|---|
| 1 | 1,710 | 1,550 | 307 | 19 | −73 | Tan. |
| 2 | 2,190 | 240 | 1,600 | 35 | −34 | Brown. |
| 3 | 1,600 | 1,420 | 314 | 23 | −77 | Clear. |
| 4 | 1,845 | 190 | 1,495 | 35 | −16 | Tan. |
| 5 | 1,290 | 1,300 | 350 | 20 | −42 | Clear. |
| 6 | 1,420 | 172 | 1,175 | 40 | −16 | Tan. |

OVEN AGED FOR 1 HOUR

| | | | | | | |
|---|---|---|---|---|---|---|
| 1 | 760 | 977 | 291 | 20 | −96 | Brown. |
| 2 | 922 | 130 | 920 | 20 | Broke | Black. |
| 3 | 1,740 | 1,370 | 364 | 18 | −58 | Clear. |
| 4 | 228 | 95 | | 20 | Broke | Black. |
| 5 | 1,490 | 1,260 | 369 | 24 | −82 | Tan. |
| 6 | 650 | 20 | | 48 | −32 | Black. |

OVEN AGED FOR 2 HOURS

| | | | | | | |
|---|---|---|---|---|---|---|
| 1 | 292 | 230 | 247 | 20 | −88 | Brown. |
| 2 | 760 | 60 | | 26 | Broke | Black. |
| 3 | 2,056 | 1,520 | 368 | 19 | −64 | Clear. |
| 4 | 181 | 50 | | 20 | −46 | Black. |
| 5 | 803 | 883 | 335 | 24 | −70 | Brown. |
| 6 | 715 | 13 | | 45 | Broke | Black. |

[1] Recipes:

| | 1 | 2 | 3 | 4 | 5 | 6 |
|---|---|---|---|---|---|---|
| Chlorinated Highly Crystalline Polyethylene (26.6% chlorine) | 100 | 0 | 100 | 0 | 100 | 0 |
| Sodium organophosphate [1] | 0.1 | 0.1 | 4.0 | 4.0 | 1.0 | 1.0 |
| Ba-Cd organo complex [2] | 3.0 | 3.0 | 0 | 0 | 0 | 0 |
| Phenyl 2-hydroxy-4-methoxyphenyl ketone [3] | 3.0 | 3.0 | 0 | 0 | 3.0 | 3.0 |
| Cadmium oxide [4] | 0 | 0 | 0 | 0 | 4.0 | 4.0 |
| Goodrich vinyl chloride polymer | 0 | 75 | 0 | 75 | 0 | 75 |
| Dioctylphthalate [5] | 0 | 38 | 0 | 38 | 0 | 38 |

[1] Sold under trade name of Ferro-541-A and having a chemical analysis as follows 8.35% C, 2.00% H, 7.41 Ba, 23.1 Na, 20.0 P and balance oxygen, i.e., a 2/1 mixture of Na$_2$P(OCH$_3$)O$_3$ and Na$_2$P$_2$(OCH$_3$)$_2$O$_5$ with a small amount of the barium salt of this organophosphate.
[2] Commercial stabilizer sold under trade name of BC-12.
[3] Ultraviolet stabilizer sold under trade name of UV #9 (Amer. Cyanamid).
[4] Antioxidant.
[5] Commonly used as a PVC plasticizer.

The following specific embodiments utilizing chlorinated polyethylene illustrates the method of incorporating stabilizer into a halogenated polyolefin according to this invention and is in no way intended to limit the invention to the embodiment shown therein.

EXAMPLE II

Ethylene was polymerized in a chromium oxide-catalyzed polymerization at the following conditions:

*Polymerization conditions*

| | |
|---|---|
| Temperature | 295° F. |
| Pressure | 420 p.s.i.g. |
| Ethylene feed rate | 77 pounds per hour. |
| Catalyst concentration in reactor | 0.141 weight percent. |
| Cyclohexane feed rate | 505 pounds per hour. |
| Polymer concentration in reactor | 8.75 weight percent. |
| Chromium content of catalyst | 5 weight percent. |
| Catalyst activation temperature | 948–950° F. |

The polymer prepared according to the above polymerization conditions had the following properties:

*Polymer properties*

| | |
|---|---|
| Volatilization | 0.0 weight percent. |
| Ash | 0.1 weight percent. |
| Melt index | 0.5. |
| Heat distortion temperature | 219° F. |
| Melting point | 252±2° F. |
| Density | 0.961. |
| Stiffness | 179,000 p.s.i. |
| Tensile strength: | |
|   Injection molded | 5260 p.s.i. |
|   Compression molded | 4380 p.s.i. |
| Percent elongation: | |
|   Injection molded | 25%. |
|   Compression molded | 22%. |
| Impact strength | 6.3 ft. pounds per inch notch. |
| Color | White. |

The above-described ethylene polymer was chlorinated according to the following procedure. Two pounds of the above described ethylene polymer and 75 pounds of technical grade carbon tetrachloride were fed to a jacketed, 10 gallon, glass-lined autoclave. The autoclave was closed and steam was introduced into the jacket to raise the temperature to 200° F. The pressure at this point was 50 p.s.i.g. Chlorine was then introduced into the reactor, and the contents of the reactor were exposed to the light of a 4-watt fluorescent lamp. Chlorination at this time was carried out for 30 minutes, during which time 0.4 pound of chlorine was added. The chlorine addition was stopped, and the reactor was cooled to 120° F. by means of cooling water. The chlorine was then turned on again, and chlorination was continued for 5 hours and 15 minutes at conditions of 125° F. and 50 p.s.i.g. The chlorine feed was then shut off, and the reactor was allowed to stand over a weekend. This chlorine addition was again started up, and chlorination was continued for 8 hours and 15 minutes at conditions of 120° F. and 50 p.s.i.g. At the end of this time, it was found that 9.3 pounds of chlorine had been introduced during the entire course of the reaction.

The contents of the autoclave were then heated to 180° F. and vented slowly to strip out residual HCl and chlorine from the solution. Fifty grams of an alkali metal organophosphate which is sold under the trade name of Ferro 541A was then added to the solution in the reactor (see Table I of Example I for analysis). This stabilizer had been previously mixed in a Waring Blendor for 3 minutes with approximately 400 cc. of carbon tetrachloride. After dispersion of stabilizer had been added to the reactor contents, the solution was reheated to 180° F. The chlorinated polymer and stabilizer were then precipitated as an intimate dispersion by the addition of an excess of isopropyl alcohol. The alcohol was added slowly, and the solution was simultaneously air blown. The precipitated polymer was then recovered and dried in a vacuum oven for 18 hours at 170° F. The chlorine content of this material was found to be 64.2 weight percent.

This stabilized polymer was found to be moldable by injection molding without decomposition taking place.

When it is attempted to injection mold chlorinated polymer which had been prepared by the chlorination of an olefin polymer from a chromium oxide-catalyzed polymerization and which had a chlorine content of approximately 65 weight percent and prepared by the above described method in the absence of stabilizer, at the temperature utilized for the stabilized polymer, decomposition took place as evidenced by evolution of HCl.

EXAMPLE III

A sample of chlorinated highly crystalline polyethylene, prepared by essentially the same polymerization procedure and chlorination procedure as described in Example II, was stabilized in the following manner. This sample, containing 67% by weight chlorine was dissolved in carbon tetrachloride. A paste was then made up by dispersing a sodium organophosphate stabilizer sold under the trade name of Ferro 541A and an epoxy type stabilizer sold under the trade name of Harshaw 7V-1 in carbon tetrachloride. This paste was then added to the solution of chlorinated polymer so as to provide 4 parts of the sodium organophosphate per 100 parts of polymer and 3 parts of the epoxy type stabilizer per 100 parts of polymer, all units being an a weight basis. An excess of methyl alcohol was then added to the mixture, and the resulting mixture was stirred until the polymer and stabilizers precipitated together as an intimate dispersion. The precipitated material was then filtered and air dried. The polymer was then divided into two portions, one portion being compression molded and the other injection molded. The compression molded sample was clear and had a brownish-orange color. The properties of this stabilized material are as follows:

Polymer properties

Tensile strength: injection molded --- 10,409 p.s.i.
Elongation: injection molded ------- 6.5%.
Shore D hardness ----------------- 89.
Impact strength: injection molded --- 0.56 foot pounds per inch notch.
Heat distortion temperature --------- 196° F.
Density -------------------------- 1.560.
Stiffness ------------------------- 343,000 p.s.i.

It was attempted to mill a stabilizer into a chlorinated polyethylene of approximately the same chlorine content as that in the above-described run. When heated to a temperature wherein the polymer was easily millable decomposition took place before the stabilizer could be sufficiently dispersed in the polymer.

EXAMPLE IV

Two runs were made to show the effect of the stabilizer on a chlorinated polyethylene during milling at elevated temperatures. A highly crystalline polyethylene prepared as in Example I was chlorinated to 64.2% combined chlorine content and split in half. One half was milled for ten minutes at 300° F. and then was molded into a ⅛ inch sheet. The second half was dry blended with 3 parts Ferro 541A per hundred parts of the chlorinated product and was milled at 300° F. for 20 minutes. The following data were obtained.

Observation and properties

| Color | Stabilized | Unstabilized |
|---|---|---|
| Color | Brown | Black. |
| Appearance | Slightly flexible | Brittle. |
| Inherent viscosity | 1.23 | 0.91. |
| Density | 1.584 | 1.543. |
| Tensile yield, p.s.i. | 9,500 | 8,965. |
| Elongation | 13 | 5. |

It can be seen by the decrease in inherent viscosity, indicating decrease in molecular weight, that degradation has taken place in the unstabilized polymer. The change in color, flexibility, and elongation are also indicative of degradation of the unstabilized material.

What is claimed is:

1. A composition ranging in properties from rubbery to leathery to resinous, said composition consisting essentially of a chlorinated polyethylene having a chlorine content ranging from 5 weight percent to 75 weight percent and being thermally stabilized with 0.5 to 5 weight parts per 100 weight parts of the chlorinated polyethylene of an organophosphate as the sole thermal stabilizer, said organosphosphate having the structural formula selected from the group consisting of $$M_{2/x}[PO_3(OR)] \text{ and } M_{2/x}[P_2O_5(OR)_2]$$

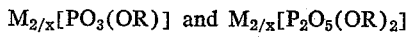

wherein M is a metal selected from the group consisting of alkali and alkaline earth metals, x is the valence of the metal M, and R is an alkyl radical containing from 1 to 5 carbon atoms.

2. The composition of claim 1 wherein the polyethylene before chlorination has a density of 0.94 to 0.97, a crystallinity of 70 percent to 95 percent and a molecular weight of 35,000 to 280,000.

3. The composition of claim 2 wherein the organophosphate is a sodium organophosphate.

4. The composition of claim 2 wherein the organophosphate is a barium organophosphate.

5. The composition of claim 2 wherein the organophosphate is a potassium organophosphate.

6. The composition of claim 2 wherein the organophosphate is a mixture of sodium organophosphate and barium organophosphate.

7. The composition of claim 2 wherein the organophosphate is a sodium alkylphosphate.

References Cited in the file of this patent
UNITED STATES PATENTS

| | | |
|---|---|---|
| 2,364,410 | Whittaker | Dec. 5, 1944 |
| 2,387,571 | Fikentscher et al. | Oct. 23, 1945 |
| 2,456,216 | Richter | Dec. 14, 1948 |
| 2,507,142 | Chaban | May 9, 1950 |
| 2,625,521 | Fischer et al. | Jan. 13, 1953 |
| 2,664,378 | Heller | Dec. 29, 1953 |